(12) United States Patent
Ewans

(10) Patent No.: US 8,407,910 B2
(45) Date of Patent: Apr. 2, 2013

(54) ROWING-BOAT GAUGES

(76) Inventor: John Frayn Ewans, Buckinghamshire (GB)

( * ) Notice: Subject to any disclaimer, the term of this patent is extended or adjusted under 35 U.S.C. 154(b) by 281 days.

(21) Appl. No.: 12/819,632

(22) Filed: Jun. 21, 2010

(65) Prior Publication Data

US 2010/0319205 A1  Dec. 23, 2010

(30) Foreign Application Priority Data

Jun. 22, 2009  (GB) .................... 0910735.0

(51) Int. Cl.
*G01B 5/14* (2006.01)
(52) U.S. Cl. ...................... 33/810; 33/501.06
(58) Field of Classification Search ............ 33/806–812, 33/23.01, 23.04, 25.1, 32.1, 32.2, 418, 419, 33/452, 454, 456, 459, 461, 462, 464, 465, 33/473, 485, 494, 501.05, 501.06, 501.5
See application file for complete search history.

(56) References Cited

U.S. PATENT DOCUMENTS

| | | | |
|---|---|---|---|
| 2,668,359 A * | 2/1954 | Litchfield | 33/810 |
| 3,650,034 A | 3/1972 | Ruckle et al. | |
| 4,703,563 A | 11/1987 | Hoshino et al. | |
| 6,195,903 B1 * | 3/2001 | Inglehart | 33/454 |
| 6,973,739 B2 * | 12/2005 | Ewans | 33/783 |
| 7,373,727 B2 * | 5/2008 | Bruce | 33/455 |
| 2006/0035753 A1 * | 2/2006 | Baker | 482/51 |
| 2009/0320307 A1 * | 12/2009 | Richter | 33/512 |
| 2010/0319205 A1 * | 12/2010 | Ewans | 33/228 |

FOREIGN PATENT DOCUMENTS

| | | |
|---|---|---|
| DE | 37 09 187 A1 | 9/1988 |
| GB | 133458 | 11/1919 |
| GB | 556379 | 8/1943 |
| GB | 2 017 913 A | 10/1979 |
| GB | 2 269 015 A | 1/1994 |
| GB | 2 402 742 A | 12/2004 |
| GB | 2 423 364 A | 8/2006 |
| JP | 08-233515 | 9/1996 |
| WO | 00/42379 A1 | 7/2000 |

OTHER PUBLICATIONS

British Search Report dated Aug. 19, 2010.

\* cited by examiner

*Primary Examiner* — Yaritza Guadalupe-McCall
(74) *Attorney, Agent, or Firm* — Davis & Bujold, PLLC

(57) ABSTRACT

A gauge (1) for rig-related measurements of a rowing boat involves a graduated slider (2) which is slidable longitudinally within a tube (3) that is parallel-mounted via pivoted links (6) on a bar (4). A head (9) of the slider (2) carries a laser (10) and is used with the bar (4) located in a seat-runner 21 to sight its beam B on the swivel-pin (24) or the face-of-work (27) of an oarlock (23). A reading of the slider-graduations is made and then again after the slider (2) has been extended with the head (9) turned down to bring the beam (B) onto the heel (25) of a rowing shoe (26) fixed in the boat. Difference between the readings gives the work-to-heel distance. Measurement of the distance-through-the-work is made from the swivel-pin (24) or face-of-work (27), to either the front end of the runners (21) or the front of the seat (22) when pushed fully forward. In an alternative gauge, the sighting device is a gun-sight mounted on a graduated slider (32) which slides on a mounting plate (37) that has feet (38) for engagement in a seat-runner (21) of the boat.

13 Claims, 4 Drawing Sheets

ROWING-BOAT GAUGES

This application claims priority from British Application Serial No. 0910735.0 filed on Jun. 22, 2009.

FIELD OF THE INVENTION

This invention relates to rowing-boat gauges, and is concerned especially with gauges and methods for rig-related measurements of rowing boats.

BACKGROUND OF THE INVENTION

The invention is concerned especially with methods of measurement related to the oarlocks of a rigged rowing-boat, and in particular to measurements related to the swivel pin or face-of-work (namely, the flat face of the oarlock on which the oar bears during the stroke).

It is an object of the present invention to provide gauges and methods for rig-related measurement of rowing boats, that facilitate the making of such measurements.

SUMMARY OF THE INVENTION

According to one aspect of the present invention there is provided a gauge for rig-related measurements of a rowing boat, wherein a sighting device for taking sightings of elements of the boat is carried by an elongate slider which is for longitudinal extension from a mount that is for positioning within the boat, and wherein the slider is graduated to provide a reading dependent on the amount by which it is extended from the mount between different sightings taken with the sighting device.

The sighting device may be a laser for emitting a light beam that is visible at least when incident on a target element such as for example the swivel-pin of a rigger of the boat. As an alternative the sighting device may be a sight for aiming by eye on the target element.

According to a feature of the invention there is provided a gauge for rig-related measurements of a rowing boat, wherein a sighting device for taking sightings of elements of the boat is carried by an elongate slider which is for longitudinal sliding extension from within a tube, the tube is mounted on a base that is for engagement with a seat rail of the boat, and wherein the slider is graduated to provide a reading dependent on the amount by which it is extended from the tube between different sightings taken with the sighting device.

According to another aspect of the invention a method for rig-related measurements of a rowing boat, involves engaging an elongate mount with one of the seat-runners of the boat to define a measurement axis extending lengthwise of the boat, the mount carrying an elongate slider which is selectively slidable longitudinally of the measurement axis and which carries a sighting device for sightings laterally of the measurement axis, sliding the slider relative to the mount to a location in which the sighting device is sighted on either a swivel-pin or a face of an oarlock of the boat, and sliding the slider relative to the mount to a location in which the sighting device is sighted on another element of the boat, and noting from the slider the distance along the measurement axis between the two locations sighted.

The other element of the boat may be the heel of a rowing shoe of the boat, or alternatively to give measurement of the distance through work may be the front of said one seat-runner or the front of the seat when the seat is pushed fully forward.

BRIEF DESCRIPTION OF THE DRAWINGS

Two forms of gauge, and methods of their use in making rig-related measurements, all in accordance with the present invention will now be described, by way of example, with reference to the accompanying drawings, in which.

DETAILED DESCRIPTION OF THE INVENTION

Figure 1:
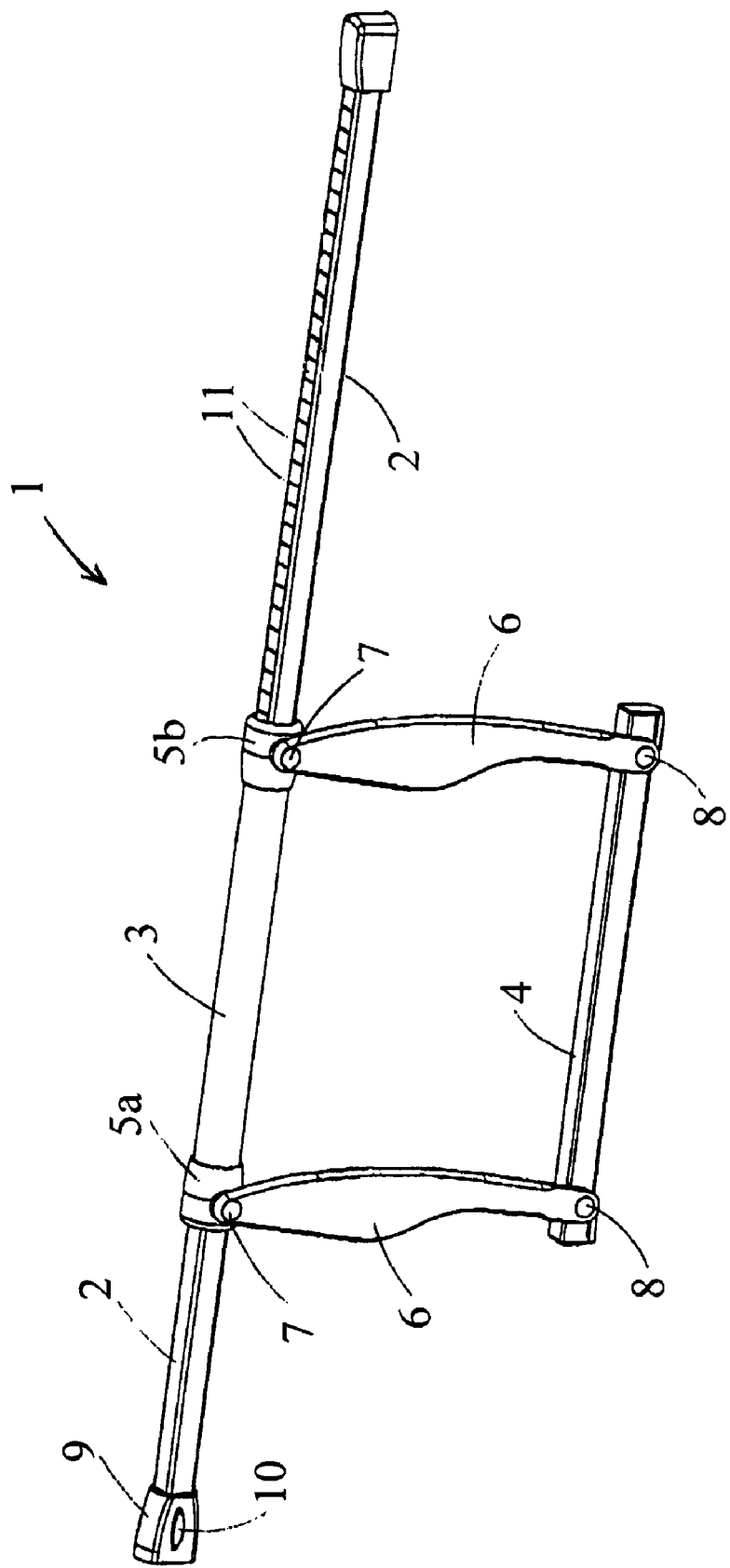
FIG. 1 is a side view of a first of the two gauges in accordance with the invention.

Referring to FIG. 1, the gauge 1 in this case involves an elongate slider 2 that is longitudinally slidable within a tube 3 which is mounted on a mount or bar 4. In the latter regard, the tube 3 has bosses 5a and 5b at its forward and rearward ends respectively that are connected to respective ends of the bar 4 by individual links 6. Each link 6 is secured to its respective boss 5a and 5b by a pivot 7 and to the respective end of the bar 4 by a pivot 8. The spacing between the pivots 7 and 8 on each link 6 is the same as the spacing between them on the other link 6, and furthermore the spacing between the two pivots 7 on the tube 3 and between the two pivots 8 on the bar 4 are also the same as one another. Thus, the links 6 establish a parallelogram interconnection of the tube 3 and bar 4 so that the tube 3 is maintained parallel to the bar 4 when deployed for use. This also enables the gauge 1 to be folded flat with the bar 4 alongside the tube 3 when not in use.

The folded gauge 1 is brought into an unfolded condition (as represented in FIG. 1) ready for deployment, by pulling the bar 4 away from the tube 3. Friction in the pivots 7 and 8 is resistant to this and is effective to maintain the gauge 1 in the fully unfolded or partially-unfolded condition with the tube 3 spaced from the bar 4 and parallel to it, without tendency to fold up.

With the gauge 1 in its fully-unfolded condition it is ready to be used for determining rigging measurements relevant to rowing efficiency of a rigged rowing boat. For ease in making the measurements, the slider 2 can be turned on its own longitudinal axis within the tube 3 through at least 180 degrees (it may be 360 degrees) about its longitudinal axis, and has a fixed head 9 at its forward end that incorporates a laser 10 for emitting, a beam B of collimated light at right angles to the slider 2. Additionally, the slider 2 is marked with graduations 11 by which its extension from the tube 3 can be determined relative to the bosses 5a and 5b.

Use of the gauge 1 for determining rigged rowing-boat measurements related to the oarlock of the rigged boat will now be described with reference to FIGS. 2 and 3. The description is in the context of measurement of the spacing longitudinally of the boat between either the swivel-pin 24 or the face-of-work 27 of a starboard oarlock 23, and the heel of the starboard rowing shoe 26 mounted in the boat.

Figure 2:
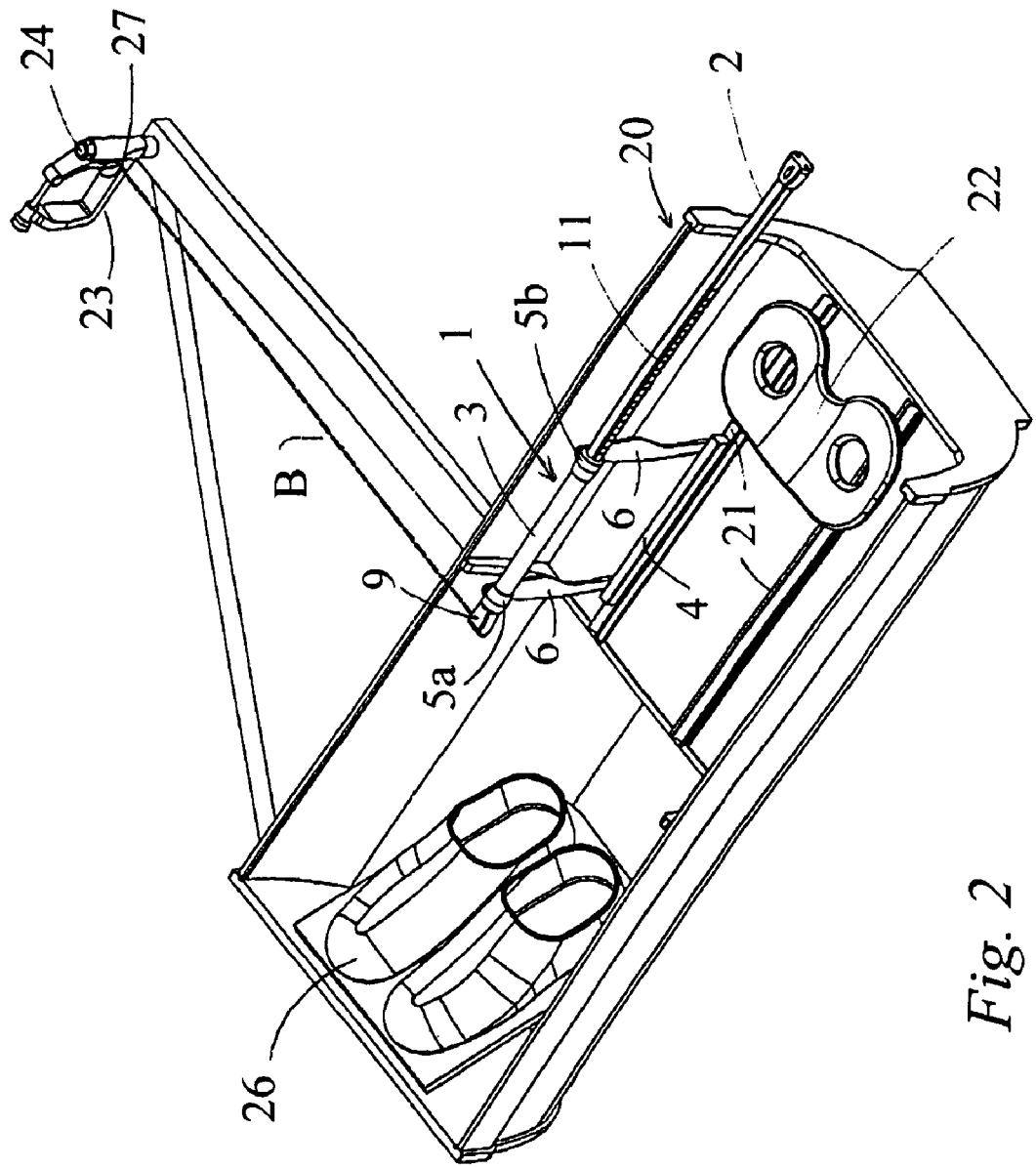
FIGS. 2 and 3 are illustrative of use of the gauge of FIG. 1 in a method according to the invention of making a rig-related measurement.

Referring initially to FIG. 2, the fully-unfolded gauge 1 is deployed in the boat 20 by locating the bar 4 in the starboard runner 21 of the pair of rails or runners 21 on which the seat 22 of the boat 20 slides back and forth lengthwise of the boat 20. This establishes a measurement axis for the gauge, and in particular for the slider 2, extending lengthwise of the starboard seat-runner 21. As a preliminary to measurement, the slider 2 is slid back fully into the tube 3 with the head 9 abutting the leading boss 5a, and is turned to direct the laser 10 outwardly of the boat 20 towards the starboard oarlock 23.

With the laser 10 turned on, the gauge 1 is slid forwardly in the starboard runner 21 to target the laser beam on the swivel-pin 24 of the oarlock 23. Reduction in height of the beam B for this can be achieved if necessary by gentle downward pressure on the tube 3 to fold the gauge 1 partially on its pivoted links 6. A first reading of the graduations 11 against the rear of the rearward boss 5b is now noted.

Figure 3:
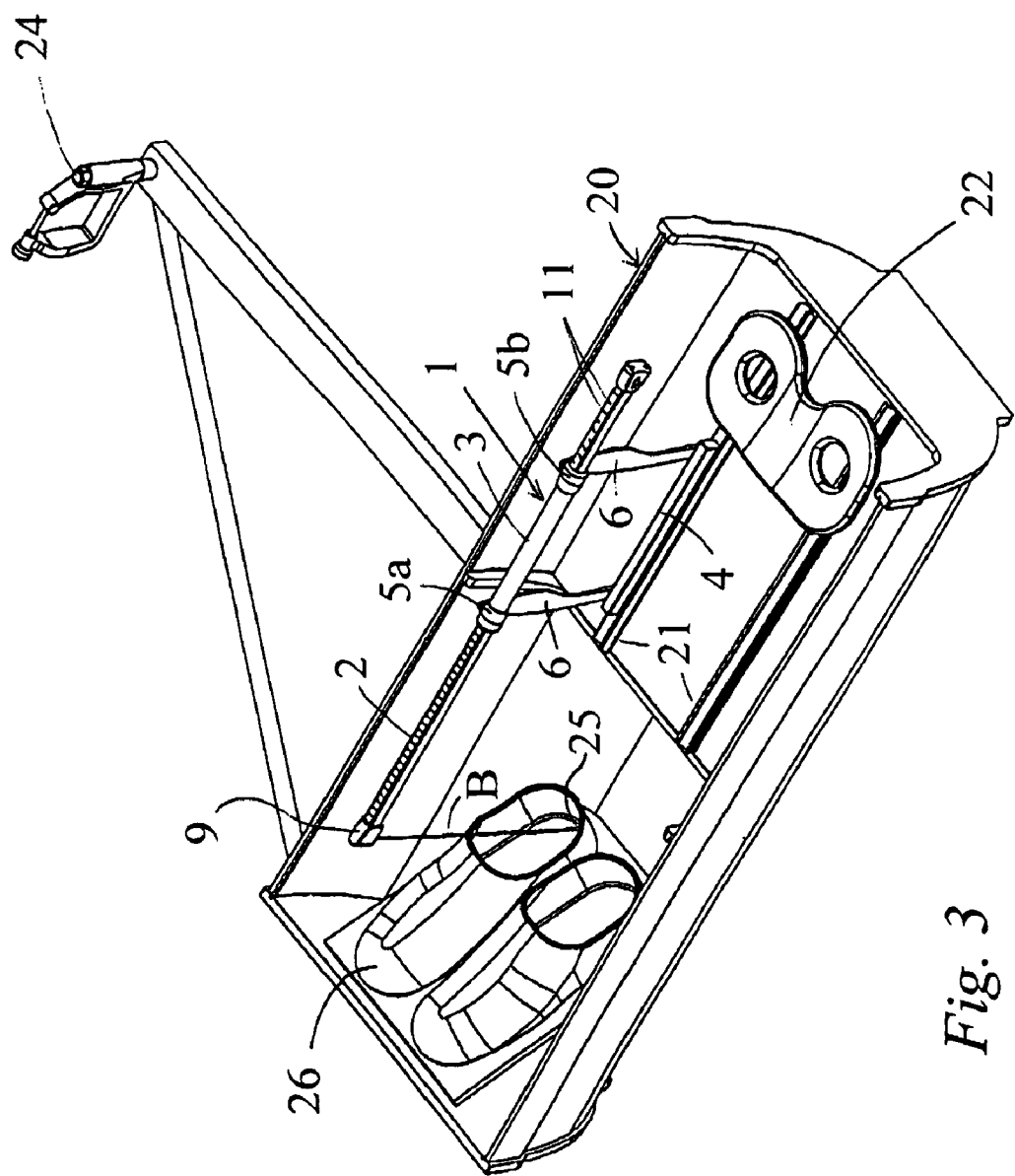

The slider 2 is now turned through a right angle to direct the laser beam B from the head 9 downwards, and is then, as illustrated in FIG. 3, extended from within the tube 3 to bring the beam B onto the heel 25 of the rower's starboard shoe 26. There is no change of location of the bar 4 within the starboard runner 21 during this, and if there has been any partial folding down of the gauge 1 for height adjustment this is retained without disturbance. A second reading is taken from the graduations 11 against the rear of the rearward boss 5b in the new position of the slider 2, so that the difference from this of the first reading gives required measurement of the longitudinal spacing of the swivel-pin 24 from the heel 25.

As an alternative, the first reading may be taken with the laser beam B targeted on the face-of-work 27, rather than the swivel-pin 24, of the oarlock 23, so that the difference between the first and second readings in this case gives the work to heel distance.

As shown in FIG. 3, the slider 2 may have graduations up to the head 9, so that in these circumstances the required measurement can be read directly from those graduations against the front of the leading boss 5a, thereby obviating the need for the first reading against the trailing boss 5b.

The gauge can also be used to measure the distance through the work, namely the distance longitudinally of the boat between the swivel-pin 24 or face-of-work 27 and either (a) the front end of the runners 21 or (b) the front of the seat 22 when the seat 22 is pushed fully forward. In case (a) the gauge 1 is initially used as described above for providing the first reading, that is to say, located in the starboard runner 21 with the beam B targeting the swivel-pin 24 or the face-of work-27, and the head 9 abutting the forward boss 5a. The slider 2 is then, after being turned through 90 degrees to direct the beam B down, is extended to target the front end of the starboard runner 21. The amount of this extension gives the required measurement.

In case (b) the seat 22 is pushed fully forward and the gauge 1 is located behind it with the bar 4 engaged in the starboard runner 21. This requires the slider 2 to be initially extended from the tube 3 in order to target the laser beam B on the swivel-pin 24 or the face-of-work 27, and to be further extended to target the beam B downwardly on the front-edge of the seat 22. Subtraction of a reading of the initial extension from a reading taken after the further extension provides the measurement required in this case.

Although the description above has been in the context of measurements made on the starboard side (otherwise referred to as the 'bow side') of the boat, a corresponding procedure is involved for measurements on the port side (otherwise referred to as the 'stroke side').

A simplified form of gauge for making the measurements described above is shown in FIG. 4, and will now be described.

Figure 4:
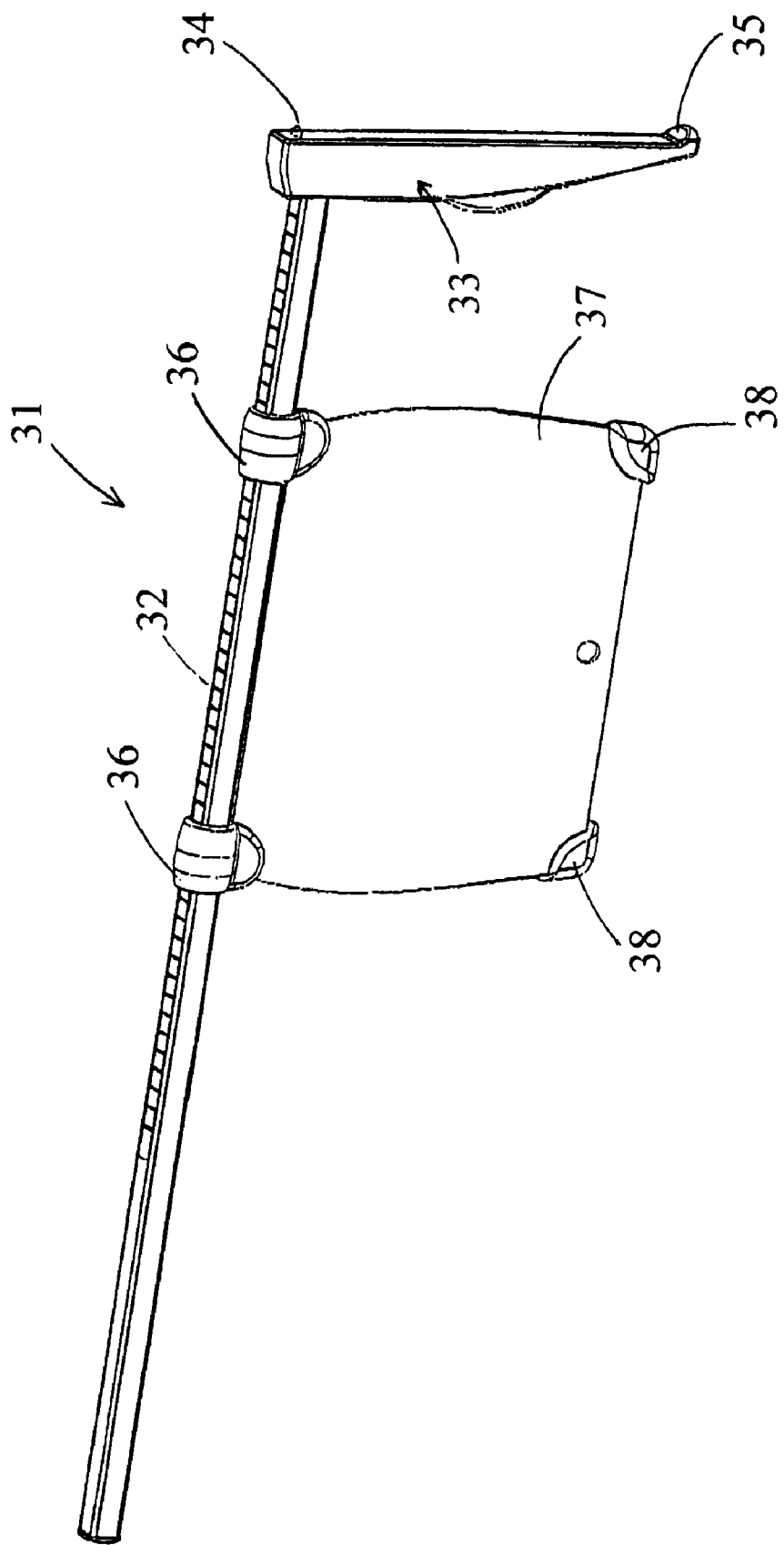
FIG. 4 is a side view of the second of the two gauges according to the invention.

Referring to FIG. 4, the gauge 31 in this case involves a graduated slider 32 that is terminated at its forward end by a sighting device 33. The sighting device 33 is comparable with a gun-sight in that aiming at a target element of the boat (for example at a swivel-pin, face-of-work of an oarlock, heel of a rower's shoe, front of a seat-runner, or front of the seat) is by alignment by eye of rear- and front-sights 34 and 35 respectively with one another and that element. The slider 32 is free to slide through two spaced bosses 36 of a substantially-rigid plate 37. The plate 37, which may be of metal or plastics, acts as a mount for the gauge 31 and has feet 38 suitable for engagement with a seat-runner of the boat.

The extent to which the slider 32 needs to be extended with respect to either boss 36 in moving aim of the sighting device 33 from one target element to another provides the required measurement of the spacing between those elements.

The invention claimed is:

1. A gauge for rig-related measurements of a rowing boat that has a seat for sliding selectively back and forth on elongate seat-runners which extend longitudinally of the boat, the gauge comprising:
    (a) an elongate mount having a longitudinal dimension defining a measurement axis of the gauge extending lengthwise of the mount, the mount comprising locating-means to engage the mount with one of the seat-runners to align the mount longitudinally with said one seat-runner, longitudinal alignment of the mount with said one seat-runner aligning the measurement axis of the gauge lengthwise with the seat-runner;
    (b) an elongate slider mounted on the mount for selective sliding extension lengthwise of the mount in displacement longitudinally of the measurement axis, the slider carrying markings indicative of an amount by which the slider is extended in displacement longitudinally of the measurement axis; and
    (c) a sighting device carried with the slider for taking sightings laterally from the slider dependent on the amount the slider is extended lengthwise of the mount in displacement longitudinally of the measurement axis.

2. A gauge according to claim 1, wherein the elongate slider is graduated to provide a reading of the amount by which the slider is extended lengthwise of the mount in displacement longitudinally of the measurement axis.

3. The gauge according to claim 1, wherein the sighting device is a laser device for emitting a beam of light at right angles to the slider.

4. The gauge according to claim 3, wherein the sighting device is angularly displaceable about the measurement axis to vary its angle of sighting relative to the mount.

5. The gauge according to claim 1, wherein the sighting device is a gun-sight device.

6. The gauge according to claim 1, wherein the mount comprises a tube, a bar for locating in said one seat-runner, and links that are each pivoted to the tube and bar to establish a parallelogram interconnection of the tube and bar by which the tube and bar are maintained mutually parallel, and wherein the slider is slidable within the tube.

7. A method for rig-related measurements of a rowing boat wherein the boat includes rowing shoes and a seat for sliding selectively back and forth on elongate seat-runners which extend longitudinally of the boat, the method comprising the steps of:
    (a) engaging an elongate mount with one of the seat-runners to define a measurement axis extending lengthwise of the mount in alignment with said one seat-runner longitudinally of the boat, the mount carrying an elongate graduated-slider which is selectively slidable longitudinally of the measurement axis and which carries a sighting device for sightings laterally of the measurement axis;
    (b) sliding the slider relative to the mount to a location in which the sighting device is sighted on one of a swivel-pin and a face of an oarlock of the boat, and (c) sliding the slider relative to the mount to a location in which the sighting device is sighted on a heel of one of the rowing shoes; and (d) noting from the graduated-slider the distance along the measurement axis between the two locations sighted.

8. The method according to claim 7, wherein the sighting device is a laser device for emitting a beam of light at right angles to the slider.

9. The method gauge according to claim 7, wherein the sighting device is a gun-sight device.

10. A method for rig-related measurements of a rowing boat wherein the boat includes a seat for sliding selectively back and forth on elongate seat-runners which extend longitudinally of the boat, the method comprising the steps of:

(a) engaging an elongate mount with one of the seat-runners to define a measurement axis extending lengthwise of the mount in alignment with said one seat-runner longitudinally of the boat, the mount carrying an elongate graduated-slider which is selectively slidable longitudinally of the measurement axis and which carries a sighting device for sightings laterally of the measurement axis;

(b) sliding the slider relative to the mount to a location in which the sighting device is sighted on one of a swivel-pin and a face of an oarlock of the boat, and (c) sliding the slider relative to the mount to a location in which the sighting device is sighted on one of a front of the seat and a front of one of the seat-runners; and (d) noting from the graduated-slider the distance along the measurement axis between the two locations sighted.

11. The method according to claim 10, wherein the sighting device is a laser device for emitting a beam of light at right angles to the slider.

12. The method gauge according to claim 10, wherein the sighting device is a gun-sight device.

13. A gauge for rig-related measurements of a rowing boat that has a seat for sliding selectively back and forth on elongate seat-runners which extend longitudinally of the boat, the gauge comprising:

(a) an elongate mount, the mount comprising locating-means for engaging with the mount with one of the seat-runners to align the mount longitudinally with the one seat-runner, and longitudinal alignment of the mount with the one seat-runner defining a measurement axis of the gauge extending lengthwise of the seat-runner;

(b) an elongate slider mounted on the mount for selective sliding extension relative to the mount longitudinally of the measurement axis, the slider carrying markings indicative of an amount by which the slider is extended longitudinally of the measurement axis relative to the mount; and (c) a sighting device carried with the slider for taking sightings laterally from the slider dependent on the amount the slider is extended longitudinally of the measurement axis relative to the mount;

wherein the mount is a plate and the slider slides within spaced bosses of the plate.

* * * * *